United States Patent
Larsen

(10) Patent No.: US 6,520,493 B2
(45) Date of Patent: Feb. 18, 2003

(54) LIFT SUPPORT STRUT WITH DIRECTIONAL DAMPING

(75) Inventor: Atle Larsen, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/810,955

(22) Filed: Mar. 16, 2001

(65) Prior Publication Data

US 2002/0130451 A1 Sep. 19, 2002

(51) Int. Cl.$^7$ .................. B60G 13/00; B60G 15/00; F16F 11/00; F16F 7/00; F16F 9/00
(52) U.S. Cl. .................. 267/201; 267/293; 267/214
(58) Field of Search .................. 267/195, 196, 267/203, 214, 216, 219, 293, 220, 221, 201, 202, 64.15; 188/270, 271, 276

(56) References Cited

U.S. PATENT DOCUMENTS

| | | | | |
|---|---|---|---|---|
| 1,991,777 A | | 2/1935 | Vaughn | 280/96.2 |
| 2,325,561 A | | 7/1943 | Weber et al. | 280/284 |
| 2,705,634 A | * | 4/1955 | Sampson et al. | 267/203 |
| 2,752,149 A | * | 6/1956 | Forcellini | 188/129 |
| 3,211,468 A | | 10/1965 | Flowers | 280/124 |
| 3,856,285 A | * | 12/1974 | Yamada | 188/129 |
| 4,178,002 A | * | 12/1979 | Kayser | 188/322.18 |
| 4,240,619 A | * | 12/1980 | Wirges et al. | 267/120 |
| 4,475,722 A | * | 10/1984 | Paton et al. | 267/202 |
| 4,706,946 A | | 11/1987 | Thorn et al. | 267/292 |
| 4,925,152 A | | 5/1990 | Hüber | 251/5 |
| 4,967,681 A | | 11/1990 | Strain et al. | 114/215 |
| 5,044,648 A | * | 9/1991 | Knapp | 188/322.17 |
| 5,120,030 A | | 6/1992 | Lin et al. | 267/120 |
| 5,183,137 A | | 2/1993 | Siwek et al. | 188/381 |
| 5,257,680 A | | 11/1993 | Corcoran et al. | 188/129 |
| 5,375,823 A | | 12/1994 | Navas | 267/195 |
| 5,487,454 A | | 1/1996 | Klembczyk et al. | 188/298 |
| 5,535,861 A | | 7/1996 | Young | 188/281 |
| 5,582,395 A | * | 12/1996 | Cheng | 267/140.2 |
| 5,613,580 A | | 3/1997 | Young | 188/300 |
| 5,634,537 A | | 6/1997 | Thorn | 188/300 |
| 5,720,369 A | * | 2/1998 | Thorn | 188/300 |
| 5,720,474 A | | 2/1998 | Sugiyama | 267/249 |
| 5,810,339 A | | 9/1998 | Küspert et al. | 267/293 |
| 5,855,363 A | * | 1/1999 | Svendsen | 267/131 |
| 5,896,959 A | | 4/1999 | Jeffries et al. | 267/250 |
| 5,961,556 A | | 10/1999 | Thorn | 623/27 |
| 5,992,262 A | | 11/1999 | Briane et al. | 74/473.16 |
| 5,996,978 A | * | 12/1999 | Asanuma et al. | 188/315 |
| 6,179,749 B1 | | 1/2001 | Thorn et al. | 482/44 |
| 6,042,094 A1 | | 3/2001 | Lee | 267/150 |
| 6,199,708 B1 | * | 3/2001 | Monaco | 188/284 |
| 6,247,687 B1 | | 6/2001 | Jensen et al. | 267/200 |
| 6,290,038 B1 | | 9/2001 | Jensen et al. | 188/381 |
| 6,296,669 B1 | | 10/2001 | Thorn et al. | 623/27 |
| 6,386,528 B1 | | 5/2002 | Thorn et al. | 267/201 |

* cited by examiner

Primary Examiner—Christopher P. Schwartz
Assistant Examiner—Devon Kramer
(74) Attorney, Agent, or Firm—Michael M. Gnibus

(57) ABSTRACT

A lift strut with directional damping comprising a housing comprising a wall that defines a housing chamber, the housing defining an axis; spring means located in the chamber; piston means movable through the chamber along the axis in a first direction and a second direction, the spring means biasing the piston means in the first direction, the piston means comprising a shaft, a seat connected to the shaft along the shaft length, and a resilient member fixed to the seat, the resilient element comprising at least one primary damping ridge and a damping tongue, each of the at least one primary damping ridges being in friction engagement with the housing as the resilient member is moved in the first and second directions, the damping tongue being in engagement with the housing wall when the resilient member is moved in the first direction and being located away from the housing wall when the resilient member is moved in the second direction.

19 Claims, 2 Drawing Sheets

LIFT SUPPORT STRUT WITH DIRECTIONAL DAMPING

FIELD OF THE INVENTION

The invention relates to an extendable and retractable strut and more particularly the invention relates to a lift support strut with a directional damper that includes a movable resilient member that produces damping forces as the resilient member is moved through the strut housing in first and second directions, the damping force being greater when the resilient member is moved in the first direction than when the resilient member is moved in the second direction.

BACKGROUND OF THE INVENTION

Directional dampers provide direction dependent damping forces that are greater when the movable damping element is displaced in a first direction than when the movable element is displaced in a second direction. Directional dampers used in a strut for controlling the displacement of movable panels such as lift gates on a van or other vehicles provide higher damping forces when the lift gate is opened than when the lift gate is closed. For purposes of the description of the invention and the prior art, generally a "strut" is any device that provides damping and spring forces to control the location and movement of a moveable member.

Such conventional struts include a housing that defines a chamber with a piston member that is movable linearly through the housing chamber as the lift gate or panel is opened and closed. In such devices the housing is charged with a volume of a gas, such as nitrogen, that is pressurized and a liquid such as oil that is flowed from one housing end to the other as the piston is displaced through the housing. As the movable panel is opened and closed and the piston travels through the housing, the strut provides the requisite damping, spring and hold open forces to control the displacement and location of the movable panel.

In conventional strut members, when the door is pulled from the fully closed position a positive force must be applied to the door by the operator in order to open the door, and once the door is displaced from the closed position by an angular distance, typically between 10 and 20 degrees, the spring force is most often sufficient to continue moving the door to the open position without significant supplemental force input by the movable panel operator. During such movement, primary damping is applied to the piston to counteract the spring forces extending the strut. As the door approaches the fully open position, increased second stage damping is applied to the piston to further retard the panel motion and thereby prevent a harmful collision when the strut is fully extended.

Because conventional struts use gas and oil to provide the requisite spring and damping forces in conventional struts, the supplied damping, hold open and spring forces can deviate from their desired values as a result of fluctuations in the ambient temperatures and negatively affect the functionality of the strut. For example, when the ambient temperature is low the gas pressure is reduced, thereby reducing the strut housing pressure and ultimately the hold open and spring forces of the unit. Moreover, because the spring force is low, the spring may be easily compressed permitting the panel to be displaced with a velocity that may result in damage to the panel or strut as the panel reaches its fully closed position. Alternatively, when the ambient temperature is high, the supplied spring forces are increased and as a result, the panel operator must supply greater than usual force to overcome the higher spring forces. The increased spring forces will increase the force required to close the panel making closing the lift gate or panel difficult.

Frequently, such movable panels are displaced by a motor. Such a motor must be large enough to be able to move the specific weight panel and also must be able to overcome spring force. Because the variations in the forces supplied by conventional fluid filled struts are great it is necessary to oversize the motor in order to effectively move the panel during the percentage of the time when the spring forces of the greatest magnitude are present. It would be desirable to utilize a smaller motor to open the lift gate. However a smaller horsepower motor may only be used if the strut is not temperature dependent and susceptible to variations in spring forces.

The foregoing illustrates limitations known to exist in present devices and methods. Thus, it is apparent that it would be advantageous to provide an alternative lift strut with directional damping that is not affected by changes in ambient temperatures. Accordingly, a suitable alternative lift strut with directional damping is provided including features more fully disclosed hereinafter. An even smaller motor may be used if the strut maintains the panel in static equilibrium during its full range of motion.

SUMMARY OF THE INVENTION

In one aspect of the present invention this is accomplished by providing a strut including a housing comprising a wall that defines a housing chamber, the housing defining an axis; spring means located in the chamber; and a directional damper comprising piston means movable through the chamber along the axis in a first direction and a second direction, the spring means biasing the piston member in the first direction, the piston means comprising a shaft, a seat connected to the shaft along the shaft length, and a resilient member fixed to the seat, the resilient element comprising at least one primary damping ridge and a damping tongue, each of the at least one primary damping ridges being in friction engagement with the housing as the resilient member is moved in the first and second directions, the damping tongue being in engagement with the housing wall when the resilient member is moved in the first direction and being located away from the housing wall when the resilient member is moved in the second direction.

The foregoing and other aspects will become apparent from the following detailed description of the invention when considered in conjunction with the accompanying drawing figures.

DETAILED DESCRIPTION OF PREFERRED EMBODIMENTS

Figure 1:
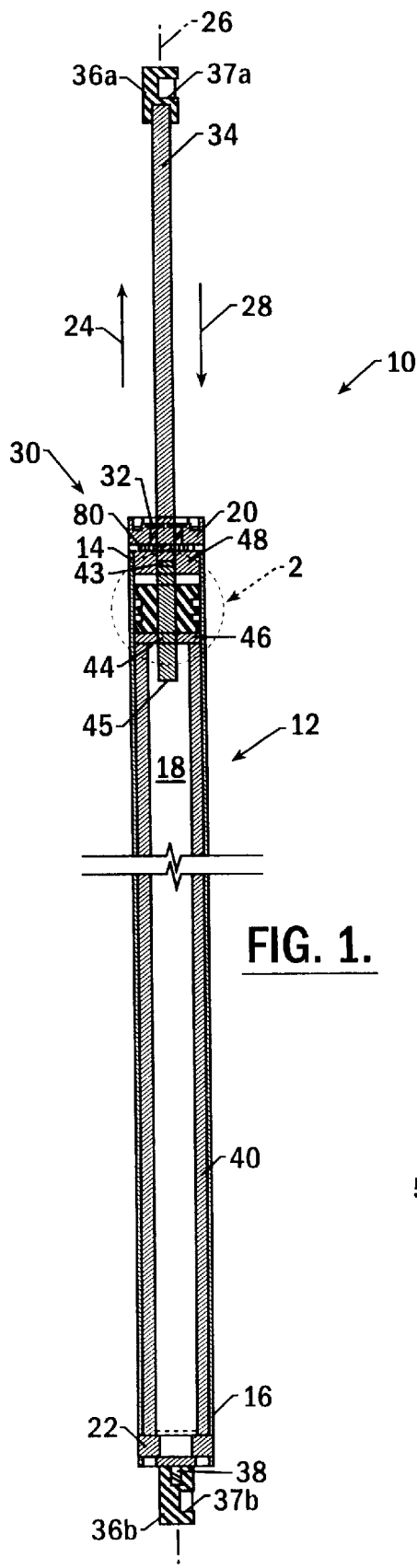
FIG. 1 is a longitudinal sectional view of the strut of the present invention.

Now turning to the drawing figures wherein like parts are referred to by the same numbers in the several views, FIG.

1 is a longitudinal section view of the strut 10 of the present invention. The strut 10 is a lift support strut adapted to support movement of a panel such as a lift gate (not shown) and provides directional damping forces that are greater when the piston assembly 30 is moved in direction 24 along longitudinal axis 26 than when it is moved along the axis 26 in direction 28. As the strut is extended and retracted the strut of the present invention performs in a manner similar to conventional gas and fluid filled struts but the performance of strut 10 is unaffected by changes in ambient conditions.

The strut 10 comprises tubular elongate housing member 12 that defines chamber 18 and includes a first open end 14 and a second closed end 16. As shown in FIG. 1, the first end is substantially closed by an endcap 20 that is fixed to the housing by a conventional means such as by a weld connection for example.

A conventional bearing member 32 is seated in an opening provided in endcap 20 and the bearing supports the piston shaft 34 as it is displaced linearly through the endcap 20 along axis 26. The bearing 32 may be any suitable bearing member, but for purposes of describing the preferred embodiment of the invention bearing 32 is a conventional flange bearing.

The strut 10 of the present invention is adapted to be connected between a frame and the movable member (both not shown) at attachment spools 36a and 36b. Spools 36a and 36b are substantially the same and include an opening 37a, 37b adapted to receive a connection member forming a ball and socket joint. By such connection, the strut 10 is maintained at a fixed location between the movable member and frame. As shown in FIG. 1, spool 36a is connected to the end of piston shaft 34 located outside housing 12 and spool 36b is connected to lateral face at the closed housing end 16. The spools 36a and 36b are fixed to the shaft and housing end using any suitable well known method such as by a friction weld for example. It is anticipated that in use, spool 36a is fixed to the movable member such as a lift gate, and spool 36b is fixed to a stationary frame. However alternatively both of the spools may be connected to movable members or spool 36b may be fixed to the lift gate and spool 36a may be fixed to the frame.

The attachment members 36a and 36b may in the alternative be comprised of conventional attachment clips that are comprised of substantially flat plates adapted to receive a connection member such as a bolt or the like to fix the clips to the movable member or frame.

A conventional compression spring 40 is seated on closed housing end 16 in chamber 18. When the spring is located in the chamber and the strut 10 is assembled, the spring is precompressed. The compression spring may be any suitable member that provides an increased resistive spring force as the spring member is compressed and biases the spring towards the extended position. More specifically, for purposes of the description of the preferred embodiment, the compression spring 40 is a coil spring well known to one skilled in the relevant art. The suitable spring 40 should have a spring constant between 5 and 10 lb/in. Unlike conventional struts the strut of the present invention 10 is not pressurized with a gas and does not include a liquid such as oil. By using the conventional coil spring with the designated spring constant, the strut of the present invention approximates the performance of conventional gas and oil charged struts as described hereinabove. However, the strut of the present invention is unaffected by temperature changes. In such conventional struts the movable panel is not in static equilibrium as the panel is displaced through its range of motion. Static equilibrium refers to a situation where the weight of the movable panel and the spring forces are equal and essentially only the damping forces must be overcome to move the panel. In an alternate embodiment strut, the strut may operate in static equilibrium during panel displacement. In order to produce such static equilibrium the spring rate of member 40 must be optimized to the required rate. Alternatively one or more spring may be used to achieve the optimized spring rate to produce static equilibrium. It is anticipated that a spring that produces desired static equilibrium will have a non-linear spring rate. Because the strut of the present invention is not affected by temperature changes a motor that is smaller than such used in combination with conventional gas/oil filled struts may be used to move the panel. A smaller motor may be used if the panel is in static equilibrium as it is displaced and the strut 10 is extended and retracted.

Figure 2A:
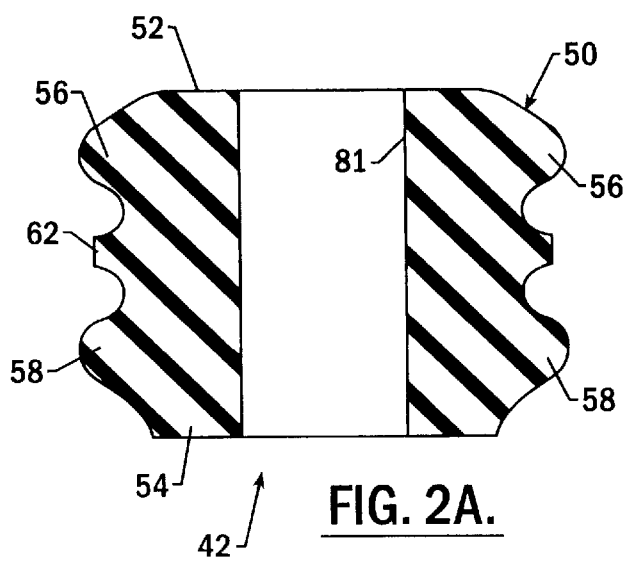
FIG. 2a is a detailed view of the elastomer member circled area identified as 2 in FIG. 1 showing the resilient member before the resilient member is precompressed by the housing.
Figure 2B:
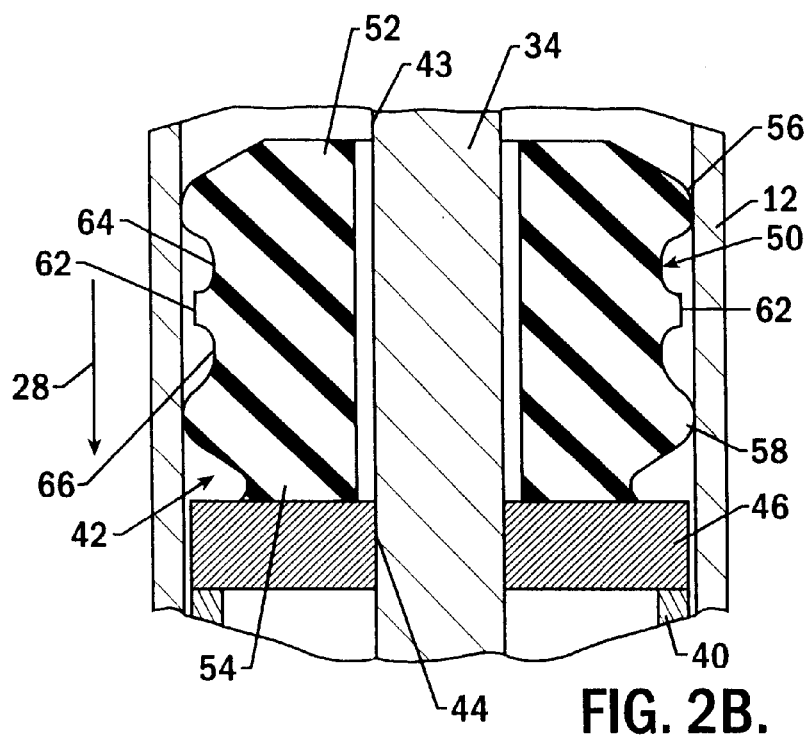
FIG. 2b is the detailed view of FIG. 2a showing the resilient element precompressed in the housing.
Figure 2C:
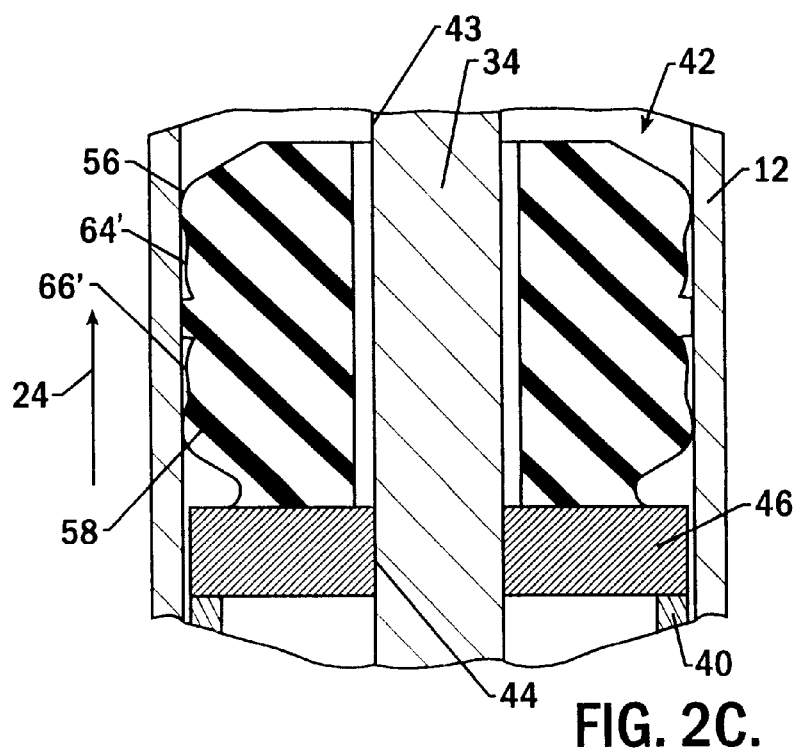
FIG. 2c the detailed view of FIG. 2b showing the resilient member bulged with the damping tongue in contact with the housing wall to provide increased damping.

Turning now to the piston assembly 30 shown in FIG. 1 and the detailed views of the FIGS. 2A, 2B and 2C, the piston assembly 30 is comprised of an elongate rod or shaft 34 having threaded portions 43 and 44 along segments of the rod length. Seat 46 is threadably connected to the shaft 34 at threaded portion 44 near rod end 45. As shown in FIGS. 2B and 2C, the outer periphery of the seat 46 is closely adjacent the inner wall of the housing 12. A lateral face of substantially cylindrical elastomer member 42 is fixed to the seat. It is preferred that the member 42 be bonded to the seat using E722 primer and E881 adhesive made by Lord Corporation of Erie, Pa. In this way, as the piston rod 34 is displaced along axis 26, the elastomer member is movable with the seat 46.

Contact Member 48 is threadably connected to piston rod 34 along threaded portion 43. As shown in FIG. 1, the seat 46 and contact member 48 are separated by a distance and the resilient member 42 is located between members 48 and 46. Cushion 80 is slid along rod 34 and against stop 48. The cushion is preferably made from a suitable rubber and serves to minimize contact between endcap 20 and stop 48 when the piston approaches the fully extended limit shown in FIG. 1. In an alternate embodiment the strut may not include contact member 48 and cushion 80 and in such an alternate embodiment the resilient element 42 would serve as both a damper and as a cushion when the strut is fully extended.

Unitary resilient damping element 42 is located along the shaft 34 between seat 46 and contact member 48. In FIGS. 2A, 2B and 2C, the element is shown in its uncompressed state in FIG. 2A, its precompressed state in FIG. 2B and bulged to provide increased damping in FIG. 2C. The element is made from a natural rubber that is impregnated with a slip agent to reduce the coefficient of friction associated with the resilient element 42. If additional reduction in the friction forces is required the interior housing wall may be coated with a suitable rubber lubricant to further reduce the friction between the housing and element to an acceptable level.

As shown in FIG. 2A, element 42 has a substantially cylindrical body 50 with ends 52 and 54, axially extending bore 81 that receives shaft 34 and annular primary damping ridges 56 and 58 located adjacent the respective body ends 52 and 54. The primary damping ridges are continuously in contact with the housing wall as the piston is moved longitudinally in directions 24 and 28. In this way, a frictional damping force is produced at all times that the element is displaced along axis 26. Each annular primary damping ridge 56 and 58 has an arcuate cross section as shown most clearly in the uncompressed element of FIG. 2A. For purposes of describing the preferred embodiment of the invention the annular damping ridges are endless however it should be understood that the ridges may be comprised of one or more discrete segments.

As shown in FIG. 2B, the element is precompressed as the ridges engage the housing wall. The preload on the resilient element may be increased by increasing the radial compression of the element. One way to increase the radial compression is to increase the lateral dimension, such as the diameter, of the element.

As shown in FIG. 2A, before the element is precompressed, the element assumes an E-shaped cross section within annular damping tongue 60 located between ridges 56 and 58. Like the damping ridges 56 and 58 the tongue extends completely around the body 50 and is endless, however in an alternate embodiment, the tongue may be comprised of one or more discrete annular segments. The tongue is separated from the contact ridges 56 and 58 by recesses 64 and 66. Tongue 60 has a substantially flat contact face 62 which maximizes the surface area that may be bulged into contact with the housing wall and in this way produces greater magnitude directional damping. However, it should be understood that contact face 62 may also be arcuate. As shown in FIG. 2A, the tongue does not extend radially outwardly to the extent that the damping members 56 and 58 extend outwardly. The tongue is not in continuous contact with the housing wall but is bulged into contact with the housing wall as the piston 30, including element 42, is moved in direction 24 toward endcap 20. See FIG. 2C.

The spring member 40 biases the piston member in direction 24 and serves as resistance to the piston displacement in direction 28. Greater magnitude damping is provided when the strut is extended, typically during lift gate opening. Greater magnitude damping is supplied when the lift gate is opened in order to control the motion of the lift gate as it is opened. Thus the piston is biased by spring 40 in direction 24 in a controlled manner. Relative to the damping in direction 24, less damping is produced when the piston is moved in direction 28 in order to overcome the spring forces and close the lift gate or other movable panel.

During operation, as the piston assembly is extended in direction 24 causing the lift gate to open or generally move in a first direction. As the lift gate or other panel is moved the damping forces supplied by the normal friction forces between the ridges 56, 58 and the housing wall are increased as the element is axially compressed due to axial displacement of seat 46 through the chamber in direction 24. The combination of the friction force and axial compression cause the element to bulge as shown in FIG. 2C. As the element is bulged the contact surface 62 of the tongue engages the housing wall and increases the damping forces already provided by the frictional engagement between the wall and the ridges 56 and 58. The spring 40 biases the piston in direction 24. The damping forces serve to control the spring extension and as a result the lift gate is moved in a controlled manner. When the member approaches the endcap 20, the cushion 80 contacts the endcap 20 thereby preventing further displacement by the piston. The hold open forces provided by the compressed element 42 and spring 40 serve to keep the movable panel in the open position. As the piston is displaced in direction 24, the damping forces increase as the velocity of the piston is increased.

As the lift gate or other movable panel is closed or generally moved in a second direction, the piston assembly is moved in direction 28, and as the seat 46 is moved in direction 28 the attached element 42 is pulled by attached seat 46 and is elongated along axis 26. As the axial dimension is increased the radial dimension of the element is decreased, the element the tongue is drawn away from and out of contact with the housing wall and the friction normal force between the ridges and housing wall is decreased. The combination of moving the tongue out of contact with the housing wall and reducing the normal friction force between the ridges and housing wall cause the damping force provided by the strut to be reduced. The spring is compressed by the movement in direction 28. Ridges 56 and 58 remain in contact with the housing wall as the piston assembly is displaced in direction 28.

By providing a lift gate strut 10 that replaces gas and oil with spring 40 and directional damper 30 the strut of the present invention is essentially unaffected by high and low ambient temperatures and provides for controlled panel movement. In the strut of the present invention the directional damping forces are increased or decreased as the piston is moved in first and second directions primarily by altering the area of the resilient element in contact with the housing wall and by changing the normal forces of friction produced between the ridges and housing.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A strut with directional damping, the strut comprising:
   (a) a housing comprising a wall that defines a housing chamber, the housing defining an axis;
   (b) a resilient element movable through the chamber along the axis in a first direction and a second direction, the resilient element comprising at least one primary damping ridge and a damping tongue, each of the at least one primary damping ridge being in friction engagement with the housing as the resilient member is moved in the first and second directions, the damping tongue being in engagement with the housing wall when the resilient element is moved in the first direction and being located away from the housing wall when the resilient element is moved in the second direction;
   and
   (c) spring means for biasing the resilient element in the first direction and for resisting displacement of the resilient element in the second direction.

2. The strut as claimed in claim 1 wherein the tongue is annular and includes a substantially flat contact surface.

3. The strut as claimed in claim 1 wherein the element has an E-shaped cross-section.

4. The strut as claimed in claim 1 wherein the resilient element is made from rubber.

5. The strut as claimed in claim 1 wherein the resilient element is comprised of two primary damping ridges.

6. The strut as claimed in claim 1 wherein the damping tongue is located between the at least one primary damping ridge.

7. The strut as claimed in claim 5 wherein each primary damping ridge is located at an end of the resilient element.

8. The strut as claimed in claim 1 wherein the strut further comprises a shaft having a seat fixed to the shaft along the shaft length, the resilient element being connected to the seat.

9. The strut as claimed in claim 1 wherein the spring means is a coil spring.

10. A strut with a directional damping, the strut comprising:
(a) a housing comprising a wall that defines a housing chamber, the housing defining an axis;
(b) spring means located in the chamber;
(c) a piston member movable through the chamber along the axis in a first direction and a second direction, the spring means biasing the piston member in the first direction, the piston member comprising a shaft, a seat connected to the shaft along the shaft length, and a resilient element fixed to the seat, the resilient element comprising at least one primary damping ridge and a damping tongue, each of the at least one primary damping ridge being in friction engagement with the housing as the resilient element is moved in the first and second directions, the damping tongue being in engagement with the housing wall when the resilient element is moved in the first direction and being located away from the housing wall when the resilient element is moved in the second direction.

11. The strut as claimed in claim 10 wherein the tongue is annular and includes a substantially flat contact surface.

12. The strut as claimed in claim 10 wherein the element has an E-shaped cross-section.

13. The strut as claimed in claim 10 wherein the resilient element is made from rubber.

14. The strut as claimed in claim 10 wherein the resilient element is comprised of two primary damping ridges.

15. The strut as claimed in claim 14 wherein the contact tongue is located between the primary damping ridges.

16. The strut as claimed in claim 14 wherein each primary damping ridge is located at an end of the resilient element.

17. The strut as claimed in claim 10 wherein the piston further comprises a contact member fixed to the shaft along the shaft length, the resilient element being located between the contact member and the seat.

18. The strut as claimed in claim 16 wherein the spring means is a coil spring.

19. The strut as claimed in claim 10 wherein the friction forces between the ridges and housing have a greater magnitude when the piston is moved in the first direction than when the piston is moved in the second direction.

* * * * *